United States Patent
Rangarao et al.

(10) Patent No.: US 8,380,494 B2
(45) Date of Patent: Feb. 19, 2013

(54) SPEECH DETECTION USING ORDER STATISTICS (75) Inventors: Muralishankar Rangarao, Bangalore (IN); Vijay Satyanarayana Rao, Bangalore (IN); Venkatesha Prasad Rangarao, Bangalore (IN); Shankar Hebbale Narasimhiah, Bangalore (IN)

(73) Assignee: P.E.S. Institute of Technology, Bangalore (IN)

( * ) Notice: Subject to any disclaimer, the term of this patent is extended or adjusted under 35 U.S.C. 154(b) by 811 days.

(21) Appl. No.: 12/515,536

(22) PCT Filed: Jan. 24, 2007

(86) PCT No.: PCT/IN2007/000028
§ 371 (c)(1),
(2), (4) Date: May 20, 2009

(87) PCT Pub. No.: WO2008/090564
PCT Pub. Date: Jul. 31, 2008

(65) Prior Publication Data
US 2010/0036663 A1 Feb. 11, 2010

(51) Int. Cl.
G10L 19/00 (2006.01)
(52) U.S. Cl. ............... 704/201; 704/215; 704/E11.003
(58) Field of Classification Search .......... 704/210, 704/215, 247, 248, E15.005, E11.003
See application file for complete search history.

(56) References Cited

U.S. PATENT DOCUMENTS

| | | | | |
|---|---|---|---|---|
| 6,182,035 B1* | 1/2001 | Mekuria | ........... | 704/236 |
| 7,412,376 B2* | 8/2008 | Florencio et al. | ........... | 704/206 |
| 2001/0014857 A1* | 8/2001 | Wang | ........... | 704/231 |
| 2001/0044719 A1 | 11/2001 | Casey | | |
| 2002/0165713 A1* | 11/2002 | Skoglund et al. | ........... | 704/240 |
| 2004/0250078 A1 | 12/2004 | Stach | | |
| 2005/0060142 A1 | 3/2005 | Visser et al. | | |
| 2005/0177364 A1* | 8/2005 | Jelinek | ........... | 704/214 |
| 2005/0192798 A1* | 9/2005 | Vainio et al. | ........... | 704/223 |
| 2006/0053002 A1* | 3/2006 | Visser et al. | ........... | 704/200 |
| 2006/0074641 A1* | 4/2006 | Goudar et al. | ........... | 704/219 |
| 2007/0021958 A1* | 1/2007 | Visser et al. | ........... | 704/226 |
| 2007/0265842 A1* | 11/2007 | Jarvinen et al. | ........... | 704/214 |

OTHER PUBLICATIONS

Ouzounov. "Robust Features for Speech Detection—A Comparative Study" 2005.*
Gorriz et al. "An Efficient Bispectrum Phase Entropy-based Algorithm for VAD" Sep. 2006.*
Tüske et al. "Robust Voice Activity Detection Based on the Entropy of Noise-Suppressed Spectrum" 2005.*
Renevey et al. "Entropy Based Voice Activity Detection in Very Noisy Conditions" 2001.*
Li et al. "An Improved Voice Activity Detection Using Higher Order Statistics" 2005.*

(Continued)

*Primary Examiner* — Greg Borsetti
(74) *Attorney, Agent, or Firm* — Ash Tankha; Lipton, Weinberger & Husick (57) ABSTRACT

The method and system disclosed herein reduces total bandwidth requirement for communication in a voice over Internet protocol application. Sample [101] and convert [102] the analog input audio signal into digital signals and derive sampled frames [103]. Compute spacings of order statistics [104]. Measure the entropy for each of the sampled frames [105]. Set a threshold for entropy [106]. Mark the audio frames as active speech frames or inactive speech frames [107]. Mark an audio frame as an' inactive speech frame when the entropy is greater than the threshold, and mark the audio frame as an active speech frame when the entropy is lesser than the threshold [107]. Transmit only the active speech frames [108].

17 Claims, 8 Drawing Sheets

OTHER PUBLICATIONS

Gorriz et al. "Voice Activity Detection Using Higher Order Statistics" 2005.*

Davis et al. "Statistical Voice Activity Detection Using Low-Variance Spectrum Estimation and an Adaptive Threshold" 2006.*

Beirlant et al. "Nonparametric entropy estimation: an overview" 2001.*

Ramirez et al. "A New Voice Activity Detector Using Subband Order-Statistics Filters for Robust Speech Recognition" 2004.*

Wu et al. "Noise Spectrum Estimation with Entropy-Based VAD in Non-stationary Environments" 2006.*

Wu et al. "Robust Endpoint Detection Algorithm Based on the Adaptive Band-Partitioning Spectral Entropy in Adverse Environments" 2005.*

Prasad et al. "Comparison of Voice Activity Detection Algorithms for VoIP" 2002.*

* cited by examiner

Step 1a. for $j = 1$ to $2$ $$\hat{H}_{m,N(Y)} = \frac{1}{N}\sum_{i=1}^{N-m}\ln\left(\frac{N(Y_{i+m}-Y_i)}{m}\right) - \psi(m) + \ln(m)$$

Step 1b. $x_{max} = max\{\hat{H}(j)\} \; \forall \; j=1 \; to \; 2$

Step 2. *threshold* = mean($\hat{H}(1) : \hat{H}(2)$)

Step 3. $x_{min} = x_{max}$

Step 4. *for $j = 3$ to end of Call*
    (a) find $\hat{H}(j)$ (as in Step 1a)
    (b) if $(x_{max} < \hat{H}(j))$ {
        $x_{max} = \hat{H}(j)$
        *incr = ($x_{max}$ + $x_{min}$) / 10*
        *threshold = (threshold + incr) / 1.23*
        }
    (c) if ($\hat{H}(j) <$ *threshold*) {
        *bSpeechFrame = 1*
        *nCompression = nCompression + 1*
        if $(x_{min} > \hat{H}(j))$ {
            $x_{min} = \hat{H}(j)$
            *incr = ($x_{max}$ + $x_{min}$) / 10*
            *threshold = (threshold + incr) / 1.23*
        }
    else {
        *bSpeechFrame = 0*
        $x_{min} = x_{max}$
    }

SPEECH DETECTION USING ORDER STATISTICS

BACKGROUND

This invention in general relates to a method for reducing the total bandwidth requirement for voice-enabled applications over the Internet and specifically relates to a method of separating speech signal from non-speech signal.

Given the rapid growth in Internet traffic, there is a shortage in the bandwidth available for the transfer of data for voice over IP applications. Speech signals consist of non-speech segments and speech segments. Non-speech segments do not contribute to comprehension and may contain noise or disturbances which are undesirable, and may cause deterioration. However, all segments, speech or otherwise, demand bandwidth for transmission. Moreover, in the context of speech recognition, segmentation of the input speech stream into "speech" and "non-speech" is the precursor to applying recognition algorithms.

Bandwidth optimization is achieved by speech compression using low bit rate codecs integrated with Voice Activity Detection (VAD). Further optimization is usually achieved by the following two methods. In the first method, VAD scheme, usually based on energy and zero-crossing methods, is embedded in codecs. Examples are G.729, Global System for Mobile communication (GSM), Adaptive Multi Rate (AMR), G.722 and $3^{rd}$ Generation Partnership Project (3GPP). In the second method, VAD scheme may not be embedded in the codec block. Selecting talk spurts and avoiding codec processing of non-speech segments at the transmitter has the additional advantage of reducing the computational load on the codec itself. This is particularly significant as the number of streams grows. In such a setup, VAD coding is independent of the speech code. Portability across codecs is an added advantage since one can use any codec after applying a stand-alone VAD that removes the non-speech part of the stream.

There is an unmet market need for a method and a system that effectively removes the non-speech component in a voice over internet protocol (VoIP) based communication system.

SUMMARY

The method and system disclosed herein seeks to separate the speech segments from the non-speech segments in an audio signal and transmit only the speech segments over the Internet. An entropy measure derived from spacings of order statistics of speech frames is used to differentiate non-speech and/or silent (inactive) zones from speech (active) zones. Non-speech segments are not transmitted; they are replaced, in general, by "comfort noise" during playout at the receiver's end, thereby increasing the proportion of available bandwidth for other users of the Internet. The present invention accomplishes a greater saving in bandwidth by detection of the speech or active signal by efficaciously discriminating it from non-speech. A threshold is devised and applied for detection of the speech and non-speech segments in real-time.

The method and system disclosed herein enables speech activity detection through Adaptation of Threshold computed from Entropy derived from Spacings of Order Statistics— which we hereinafter refer to as ATESOS.

The method and the system disclosed herein are scalable across different frame sizes.

The method and the system disclosed herein determine the boundaries between contiguous active and inactive zones with sharper accuracy, thereby improving the effectiveness of speech spurt detection and speech recognition.

The method and the system disclosed herein can be implemented in low Signal-to-noise ratio (SNR) environments since frame classification, or packet classification in the context of packet-switched network, for example, VoIP, is independent of the signal energy, and depends only on the signal entropy.

Thus, the method and the system disclosed herein are applicable to packet switched networks for improving bandwidth utility.

The method and the system disclosed herein initialize the threshold by observing merely two initial packets. Hence, the decision to differentiate speech from non-speech segments is made almost instantaneously. This rapid decision-making process minimizes delay to the extent that it is perceived as effectively on-line and real-time in its implementation.

The method and the system disclosed herein is applicable for VoIP, speech recognition, speech-to-text, biometrics, etc. Speech boundary segmentation in the context of speech-to-text, speech recognition and spealer recognition are some examples in point. Further, the system and method is adaptable to varying quantization levels of 8-bit, 16-bit, for instance. This scheme is therefore portable in its present form, equally efficaciously, across different quantization levels.

The method and the system disclosed herein are less sensitive to the characteristics of the microphone employed to capture the original speech stream.

BRIEF DESCRIPTION OF THE DRAWINGS

The foregoing summary, as well as the following detailed description of the embodiments, is better understood when read in conjunction with the appended drawings. For the purpose of illustrating the invention, there is shown in the drawings exemplary constructions of the invention; however, the invention is not limited to the specific methods and instrumentalities disclosed.

FIG. 6 illustrates the output waveform for speech activity detection (SpAD) with 5 dB babble noise.

DETAILED DESCRIPTION OF THE INVENTION

Figure 1:
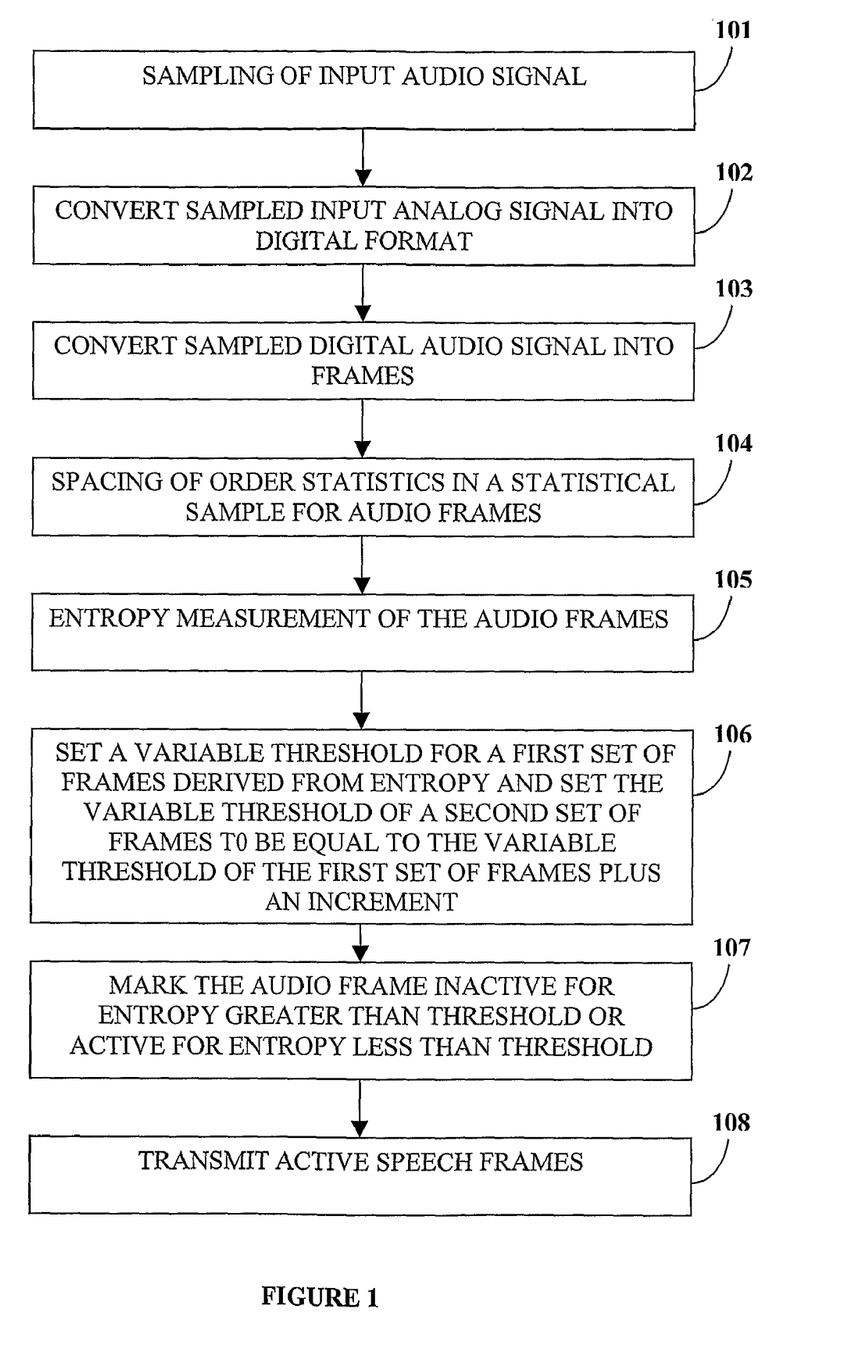
FIG. 1 illustrates a method for reducing total bandwidth requirement for voice-enabled applications over the internet by transmitting only the frames containing active speech segments.

FIG. 1 illustrates a method for reducing total bandwidth requirement for voice-enabled applications over the internet by transmitting only the frames that consist of active speech segments. The analog input audio signal is sampled 101 and converted into a digital signal 102. The sampled digital audio signal is then converted into audio frames of a fixed size 103.

The spacings of order statistics is computed for the above audio frames 104. Any intelligible speech segment, such as human speech or music, contains redundant information while noise or non-intelligible speech is characterized by lesser redundancy; i.e., it possesses "high" information content. Entropy reflects a measure of information content. Thus it follows that all intelligible speech segments have lower entropy or randomness in them and the non-intelligible speech segments have higher entropy. A statistical analysis of intelligible speech vis-à-vis non-intelligible speech reveals that over the mixed sample, non-intelligible speech segments have probabilities closer to the mean of the sample, whereas the probabilities associated with intelligible speech lie away from the mean and have a larger variance.

Entropy for each of the frames is calculated 105. Entropy is measured at each of the input instances, i.e. at the occurrence of the audio signal at a given time. A threshold is set for a first set of frames based on the entropy measured 106. The first set of frames may comprise one or more frames. The threshold for a second set of frames is equal to the threshold for the first set of frames plus an increment. The increment may be positive or negative. The threshold for each frame in the second set may vary depending on the entropy of the frame and the threshold of the past frame plus the increment. The second set of frames may comprise one or more frames. The maximum and the minimum values of entropy are calculated for different input instances. If the entropy of the frame under consideration is greater than the threshold, then the frame is marked inactive; otherwise the frame is marked active 107. The active speech frames are transmitted 108.

An adaptive threshold is achieved by sensitizing the threshold to varying entropy values of input frames as they stream in. The value to be added to, or subtracted from the threshold, called the increment, is determined by two variables: $x_{max}$ and $x_{min}$. $x_{max}$ is the maximum entropy attained until the current frame; $x_{min}$ depends on whether the frame is active or inactive. The increment is calculated as a percentage of the sum of $x_{max}$ and $x_{min}$. In particular, a non limiting example of the invention uses 10% of the sum of $x_{max}$ and $x_{min}$ as the increment. If the current frame is active then $x_{min}$ will be equal to minimum entropy observed over all the frames until the current frame in the given talk spurt. A talk spurt consists of consecutive frames marked as active. Usually, speech frames occur in bursts, and similarly silence frames occur in bursts. If the frames are marked as inactive, then $x_{min}$ will be equal to $x_{max}$. Therefore $x_{min}$ will be high if the frame is inactive and $x_{min}$ will be low if current frame is active.

Figure 8:
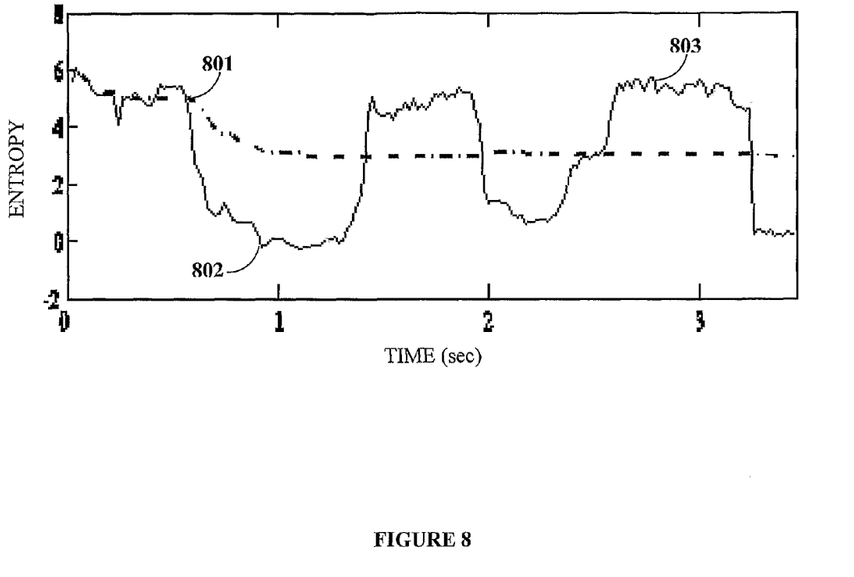
FIG. 8 illustrates how $x_{min}$ and $x_{max}$ are determined for calculating the threshold.

FIG. 8 illustrates the calculation of $x_{min}$ and $x_{max}$. Initially $x_{min}$ and $x_{max}$ are calculated.

Figure 2:
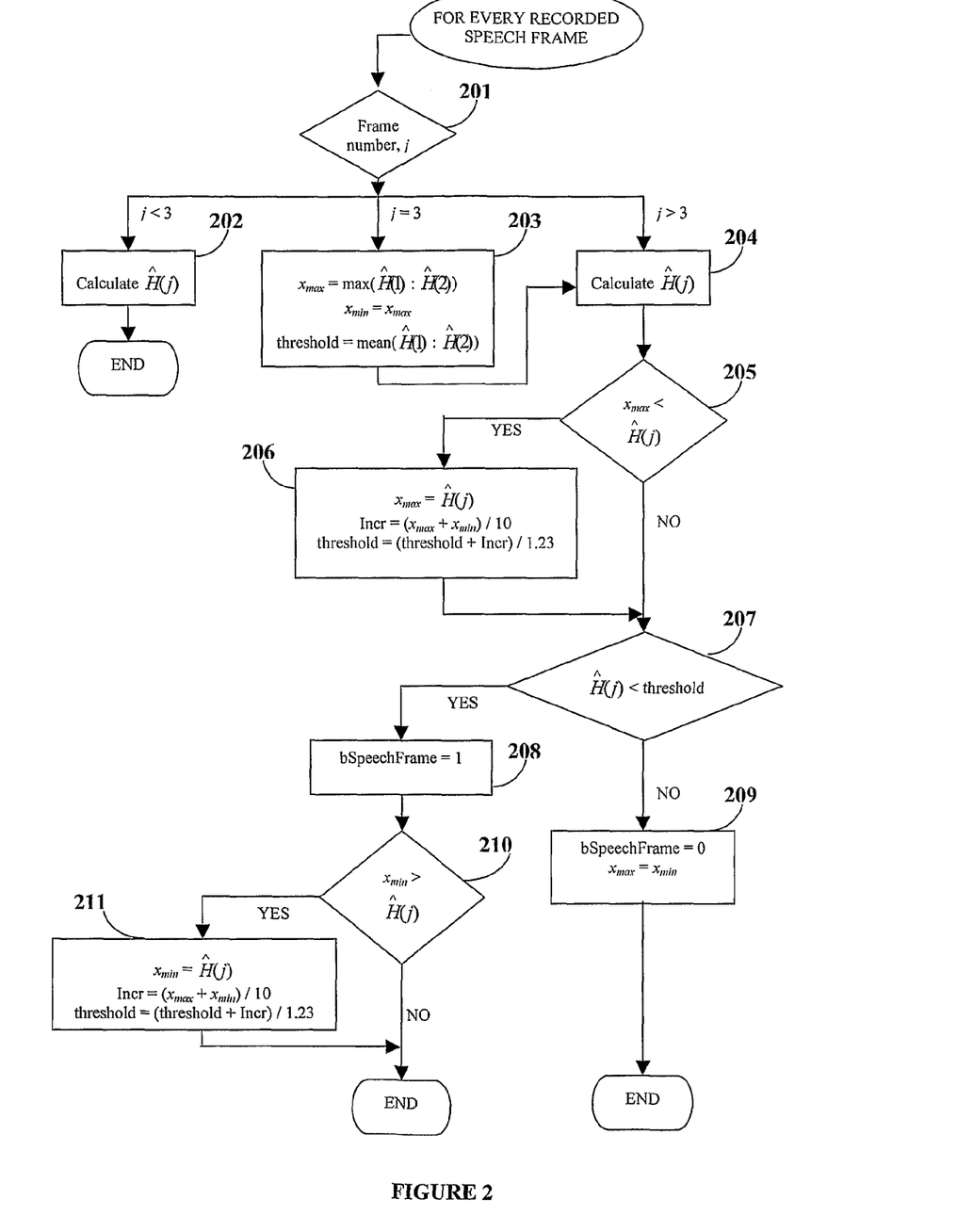
FIG. 2 illustrates the flowchart for the ATESOS algorithm used in the detection and the separation of the active speech frames from the inactive speech frames in an audio signal.
Figure 4:
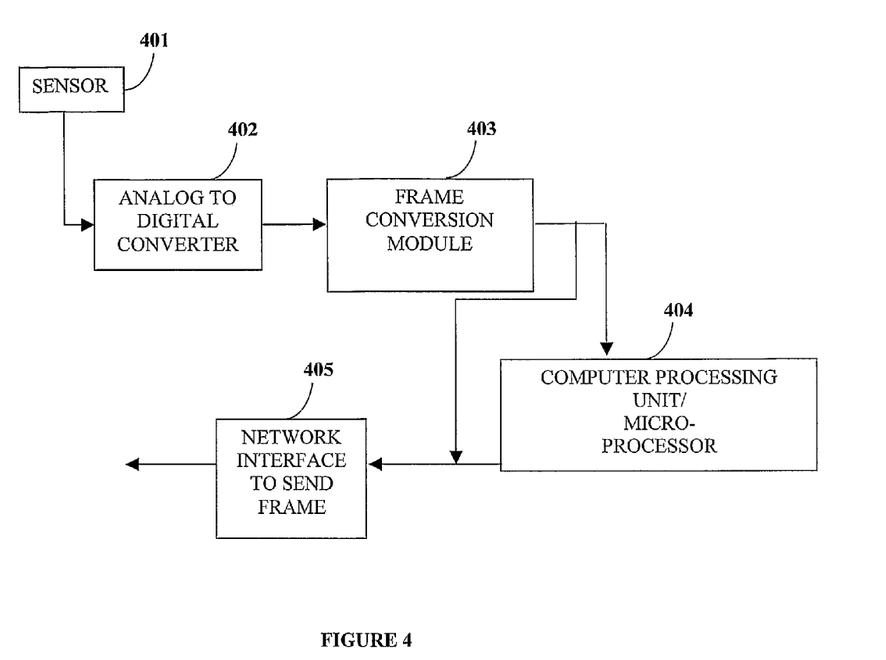
FIG. 4 illustrates the system diagram that implements the separation of the active speech frames from the inactive speech frames.

As stated above, $x_{max}$ is the maximum entropy attained until the current frame; and the graph for $x_{max}$ monotonically increases. Hence there is a need to sensitize the threshold to the varying nature of the input to the sensor 401. A change in $x_{max}$ results in a new threshold value. This new threshold value is a step closer to $x_{max}$. The $x_{min}$ depends on whether the current frame is active or inactive. For an active frame, it is checked if the entropy of the current frame is lesser than $x_{min}$. If the entropy of the current frame is lesser than $x_{min}$, then $x_{min}$ is updated and a new threshold is calculated 211. Once the least value is hit upon in that active speech segment, the $x_{min}$ and, hence, the threshold do not change.

In an inactive speech segment, the $x_{min}$ and $x_{max}$ are equal. A change only in $x_{max}$ results in adaptation of the threshold to the dynamics of the input.

Due to the variation of the $x_{min}$, the increment will be a small step in the direction of the movement of the entropy curve. The threshold is calculated only if there is a change in either the $x_{max}$ or $x_{min}$. The frames consisting of active speech frames are separated from the inactive speech frames and are transmitted over the Internet 108. Thus the transmitted frames consist of only the active speech frames, thereby reducing bandwidth requirement for voice-enabled applications over the Internet. FIG. 2 illustrates the flowchart for the ATESOS algorithm used in the detection and the separation of the active speech frames from the inactive speech frames in an audio signal. The ATESOS algorithm marks the speech frame as active or inactive with reference to the threshold.

For each of the recorded speech frames 201, the entropy is calculated using spacings of order statistics for the first two frames. The first two frames are represented by j=1, 2. For the values of j=1 to 2, 202 the entropy H for the frames is calculated using the formula $$\hat{H}_{m,N(Y)} = \frac{1}{N} \sum_{i=1}^{N-m} \ln\left(\frac{N(Y_{i+m} - Y_i)}{m}\right) + \ln(m) \quad \text{Equation (1)}$$

where $Y_{i+m}-Y_i$ for $1 \leq i < i+m \leq N$ is m-spacings of the nth order statistic.

N is the number of samples in a frame

Y is the set of ordered samples of a frame

For j=3 203 the maximum value, $x_{max}$, in the first two frames is calculated, wherein $x_{max}$ is the maximum entropy attained until the current frame.

$$x_{max} = \max\{\hat{H}(j)\} \forall j = 1 \text{ to } 2$$

The threshold is a moving average and it is initialized to the mean of the first two entropy values $$\text{threshold} = \text{mean}\{\hat{H}(1), \hat{H}(2)\}$$

$x_{min}$ is initialized to $x_{max}$, wherein if the current frame is active, then $x_{min}$ will be equal to minimum entropy observed over all the frames until the current frame. If the frame is marked inactive then the $x_{min}$ is equal to $x_{max}$.

$$x_{min} = x_{max}$$

The entropy is calculated 204 for each frame starting from the third frame and as-and-when a recorded speech frame is available. A check is performed to determine if the entropy calculated is greater than the $x_{max}$ 205. If the entropy calculated 204 is greater than the $x_{max}$ 205, the $x_{max}$ and the threshold are calculated as follows 206, $$(x_{max} < \hat{H}(j))$$

$$x_{max} = \hat{H}(j)$$

$$\text{incr} = (x_{max} + x_{min})/10$$

$$\text{threshold} = (\text{threshold} + \text{incr})/1.23$$

If the entropy obtained for the current frame is less than the threshold 207, the frame is marked as active by assigning bspeechframe to 1 208.

$$(\hat{H}(j) < \text{threshold})$$

$$b\text{SpeechFrame} = 1$$

$$n\text{Compression} = n\text{Compression} + 1$$

A check is performed to determine if a new $x_{min}$ is achieved, and if the $x_{min}$ is greater than entropy 210, a new threshold is calculated as follows 211:

$$(x_{min} > \hat{H}(j))$$

$$x_{min} = \hat{H}(j)$$

$$\text{Incr} = (x_{max} + x_{min})/10$$

$$\text{threshold} = (\text{threshold} + \text{Incr})/1.23$$

If the entropy calculated for the frame is greater than the threshold, then the frame is marked as inactive by assigning bspeechframe to 0 and initializing $x_{min}$ to $x_{max}$ 209. A new threshold value is calculated as 81.3% of the sum of the threshold and increment.

$$b\text{SpeechFrame} = 0$$

$$x_{min} = x_{max}$$

If bSpeechFrame is zero, the transmission of speech frames is withheld, i.e., the conversation is in 'silence'. Similarly the consecutive frames marked as bSpeechFrame=1 results from a talk spurt.

Figure 3:
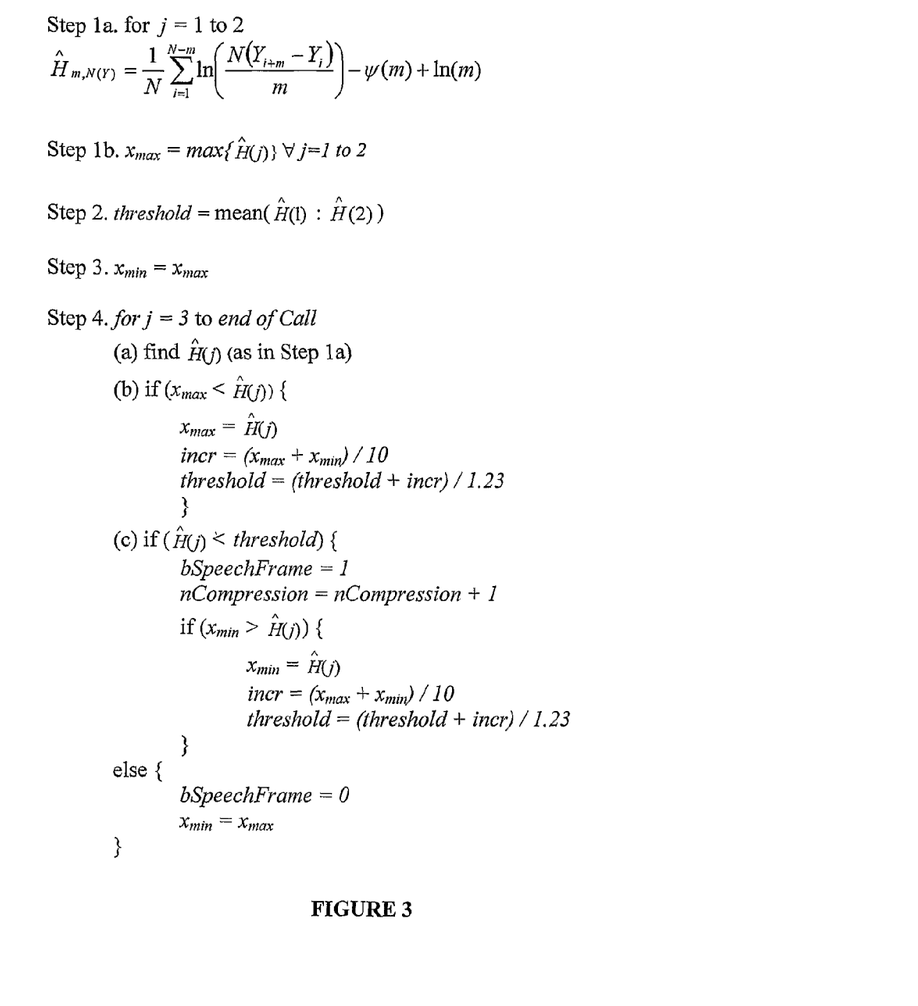
FIG. 3 illustrates the Pseudo code of the ATESOS algorithm used in the detection and the separation of the active speech frames from the inactive speech frames in an audio signal.

FIG. 3 illustrates the Pseudo code of the ATESOS algorithm used in the detection and the separation of the active speech frames from the inactive speech frames in an audio signal.

FIG. 4 illustrates the system diagram that implements the separation of the active speech frames from the inactive speech frames. The analog audio input is taken from the sensor 401. Optionally, the analog audio input can be a speech file that is directly fed to the analog to digital converter 402. The analog audio input is passed through an analog to digital converter 402 for analog to digital conversion. The digital audio signal is then passed into a fixed-sized buffer 403 to convert the digital audio signal into frames of a particular size. The digitized and buffered audio signal converted to frames is then passed through the central processing unit 404. The microprocessor located in the central processing unit 404 applies the ATESOS algorithm and differentiates the active speech frames from the inactive speech frames. The network interface module 405 accepts only the active speech frames and transmits them over the internet in the form of packets. The central processing unit 404 computes spacings of order statistics in a statistical sample for said sampled frames, measures the entropy of each of said sampled frames, sets threshold for entropy and marks the audio frames. The step of marking comprises marking the audio frame as an inactive speech frame when the entropy is greater than the threshold, and marking the audio frame as an active speech frame when the entropy is lesser than the threshold.

At the receiver, the inactive speech frames are not received. During playout of the buffers, the silence created by inactive frames at the transmitter is substituted by comfort noise making the listener perceive that the inactive frames were transmitted.

Figure 5A:
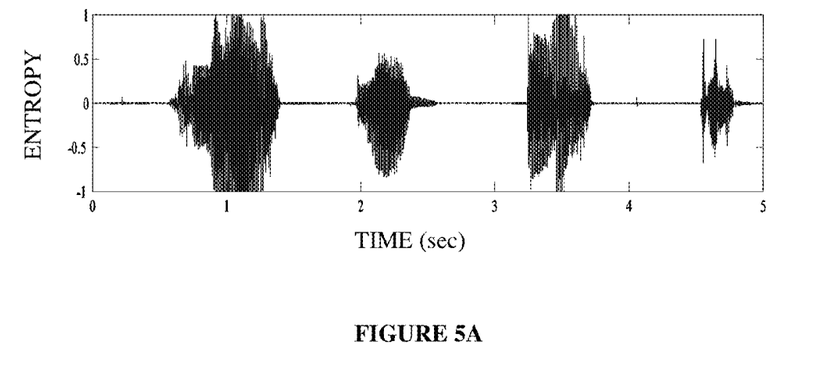
FIG. 5A illustrates the speech signal for utterances of "/Hello/, /One/, /Two/, /Three/" with deliberate pauses in between the words.

FIG. 5A illustrates the speech signal for utterances of "/Hello/, /One/, /Two/, /Three/" with deliberate pauses in between the words.

Figure 5B:
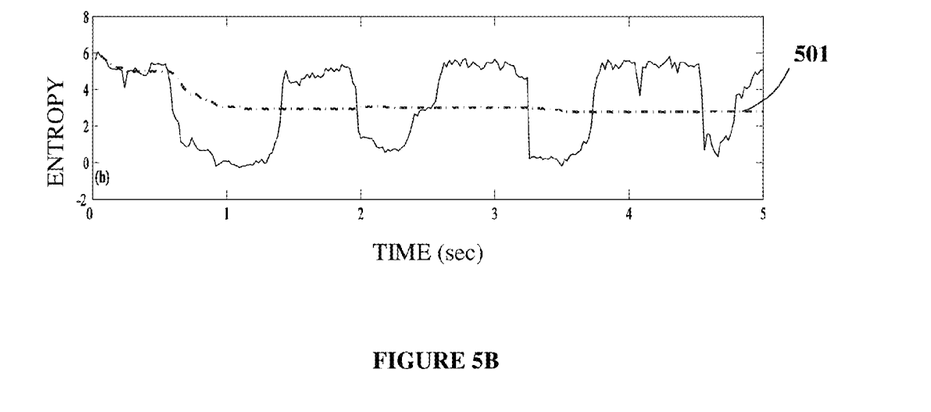
FIGS. 5B and 5C illustrate the output waveforms from the application of the ATESOS algorithm, for a zero noise condition and 20 ms frame size.
Figure 5C:
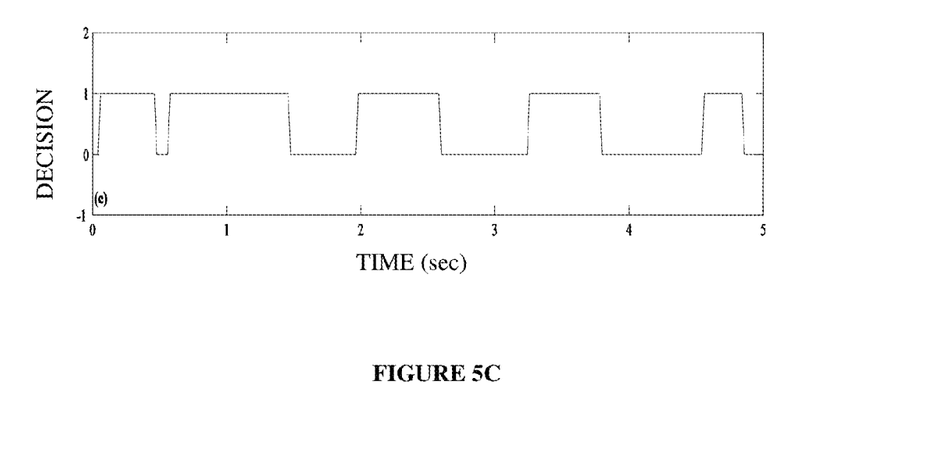

FIGS. 5B and 5C illustrate the output waveforms from the application of the ATESOS algorithm, for a zero noise condition and 20 ms frame size.

FIG. 5B illustrates the entropy obtained from the spacings of the order statistics using the equation (1), described earlier under the description of FIG. 2. The dotted line 501 in FIG. 5B illustrates the threshold values for the respective entropy values.

FIG. 5C illustrates the decision taken by the ATESOS algorithm. The speech frame is marked as active if decision is 1, and inactive if the decision is 0. The decision is 1 when the entropy value is less than the threshold.

Figure 6A:
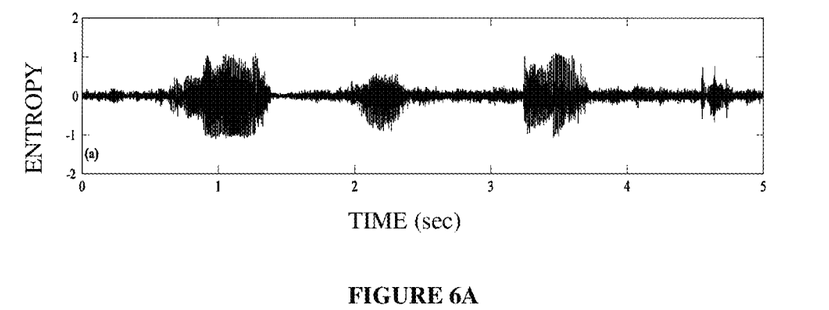
FIG. 6A illustrates the speech signal of utterances of "/Hello/, /One/, /Two/, /Three/" with deliberate pauses in between the words.

FIG. 6A illustrates the speech signal of utterances of "/Hello/, /One/, /Two/, /Three/" with deliberate pauses in between the words. The signal is corrupted with additive babble noise and the overall SNR is 5 dB.

Figure 6B:
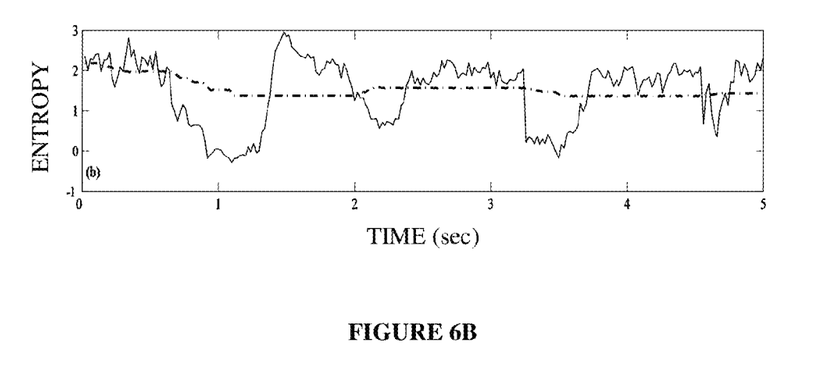
FIG. 6B illustrates the entropy obtained from the spacings of the order statistics.

FIG. 6B illustrates the entropy obtained from the spacings of the Order Statistics using equation (1). The frame size considered is 20 ms. The dotted line in FIG. 6B illustrates the threshold values for the respective entropy values.

Figure 6C:
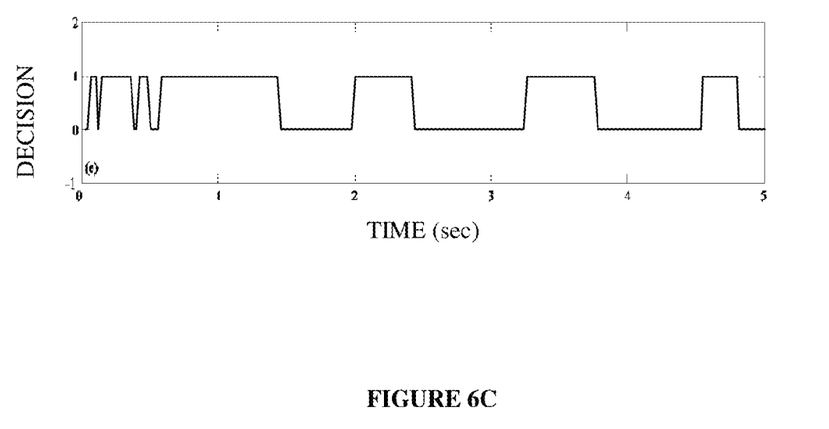
FIG. 6C illustrates the decision taken by the ATESOS algorithm.

FIG. 6C illustrates the decision taken by the ATESOS algorithm. The speech frame is marked as active if the decision is 1 and inactive if the decision is 0. The decision is 1 when the entropy value is less than the threshold and the decision is 0 if the entropy value is greater than the threshold.

Figure 7A:
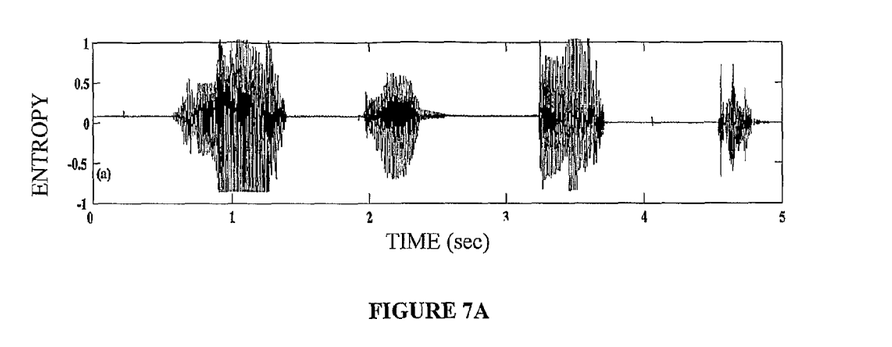
FIG. 7A illustrates the speech signal for utterances of "/Hello/, /One/, /Two/, /Three/" with deliberate pauses in between the words.
Figure 7B:
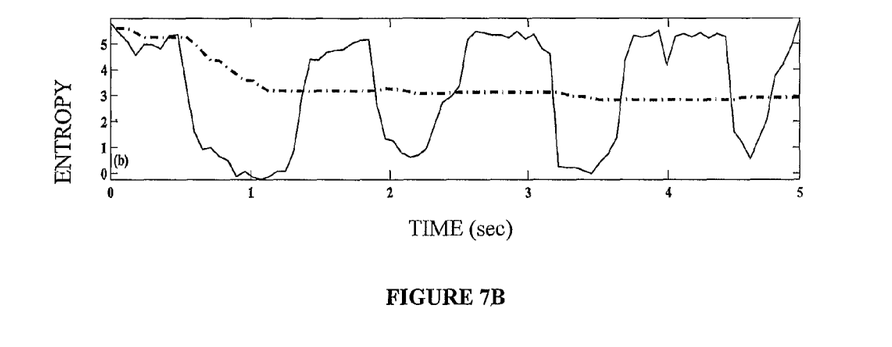
FIGS. 7B and 7C illustrate the output waveform from the implementation of the speech activity detection (SPAD) algorithm.
Figure 7C:
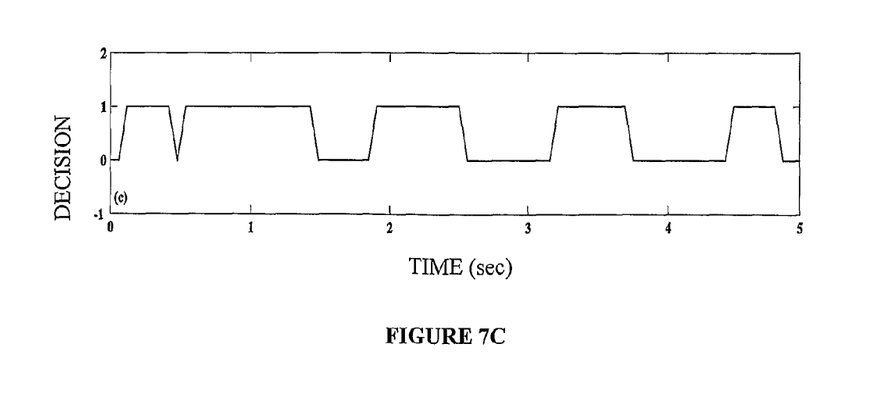

FIG. 7A illustrates the speech signal for utterances of "/Hello/, /One/, /Two/, /Three/" with deliberate pauses in between the words. FIG. 7B and FIG. 7C illustrate the output waveform from the implementation of the speech activity detection (SpAD) algorithm.

FIG. 7B illustrates the entropy obtained from the spacings of the order statistics using equation (1). The frame size considered is 60 ms. The dotted line in FIG. 7B illustrates the adaptive threshold values for the respective entropy values. The adaptive threshold is computed using the ATESOS algorithm described in FIG. 2 and FIG. 3.

FIG. 7C illustrates the decision taken by the ATESOS algorithm. The speech frame is marked as active if the decision is 1 and inactive if the decision is 0. The decision is 1 when the entropy value is less than the threshold and the decision is 0 if the entropy value is greater than the threshold.

FIG. 8 illustrates the calculation of $x_{min}$ and $x_{max}$. 801 points to the location on the entropy curve from where the $x_{min}$ starts decreasing in that active speech region. 802 points to the least value that $x_{min}$ reaches in that active speech region. 803 points to the location in the entropy curve where $x_{max}$ reaches the highest value.

The method and system disclosed herein accomplishes a greater saving in bandwidth by detection of the speech/active signal by efficaciously discriminating from non-speech.

Using the ATESOS algorithm, the speech burst is located accurately. Information on the location of the speech burst may be provided to an echo cancellation module (not shown in figure). The identification of the location of the speech burst aids in the process of subtracting the return signal in VoIP systems.

The location of the speech burst can be provided to a speech recognition module (not shown in figure) for accurately mapping and identifying the words. The ATESOS algorithm may be used to preprocess audio data for a speech recognition module.

The location of the speech burst can be provided to coding modules for reducing the level of computation required for coding the speech data.

The foregoing examples have been provided merely for the purpose of explanation and are in no way to be construed as limiting of the present method and system disclosed herein. While the invention has been described with reference to various embodiments, it is understood that the words that have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A method of reducing total bandwidth requirement in voice communication using packet transmission, said method comprising the steps of:
    sampling audio signals and converting said sampled audio signals into sampled digital signals of frames;
    computing spacings of order statistics of said frames and deriving the entropy of each of the frames;
    setting a threshold for a first set of frames derived from said entropy of said first set of frames, wherein said first set of frames comprises two or more frames, and setting the threshold of a second set of frames that is subsequent to said first set of frames to be equal to the threshold of the first set of frames plus an increment, wherein said second set of frames comprises one or more frames;
    recalculating the threshold if there is a change in one of $x_{max}$ and $x_{min}$, wherein $x_{max}$ is set equal to the maximum entropy attained up to a current frame, wherein the $x_{min}$ is set equal to the $x_{max}$ if the current frame is marked as an inactive speech frame, and wherein the $x_{min}$ is set equal to the minimum entropy observed up to the current frame in a contiguous set of exclusively active speech frames in said second set of frames if the current frame is marked as an active speech frame;
    marking the second set of frames, wherein the step of marking comprises marking the second set of frames as inactive speech frames when the entropy of the second set of frames is greater than the threshold of the first set of frames, and marking the subsequent frames as active speech frames when the entropy of the subsequent frames is lesser than the threshold of the first set of frames; and
    transmitting only the active speech frames.

2. The method of claim 1, wherein the entropy for each frame is measured from density estimates based on spacings of order statistics.

3. The method of claim 1, wherein the increment is calculated as a percentage of the linear sum of $x_{max}$ and $x_{min}$.

4. The method of claim 1, wherein a silence created by inactive speech frames is substituted by comfort noise.

5. The method of claim 1, wherein size of said frames is scalable across different frame sizes.

6. The method of claim 1, wherein quantization levels of said sampled digital signals is scalable across different quantization levels.

7. A method of reducing total bandwidth requirement in voice communication using packet transmission, said method comprising the steps of:
    sampling audio signals and converting said sampled audio signals into sampled digital signals of frames;
    computing spacings of order statistics of said frames and deriving the entropy of each of the frames;
    setting a threshold for a first set of frames derived from said entropy of said first set of frames, wherein said first set of frames comprises two or more frames, and setting the threshold of a second set of frames that is subsequent to said first set of frames equal to the threshold of the first set of frames plus an increment, wherein said second set of frames comprises one or more frames, and wherein the step of setting said threshold for entropy comprises comparing the entropy of a frame number, k, with $x_{max}$ and $x_{min}$, comprising:
        determining if the frame of frame number, k, belongs to said first set of frames, and if the frame of frame number, k, belongs to said first set of frames:
            calculate the entropy of the frame with m spacings of an $n^{th}$ order statistic;
            set $x_{max}$ equal to the maximum entropy value in the first set of frames;
            set $x_{min}$ equal to $x_{max}$; and
            set the threshold equal to a mean entropy value value of the first set of frames;
        determining if the frame of frame number, k, belongs to said second set of frames, and if the frame of frame number, k, belongs to said second set of frames:
            set $x_{max}$ equal to the maximum entropy value of all the frames previous to the current frame;
            determine if the entropy value of the current frame is greater than said set $x_{max}$, and if the entropy value of the current frame is greater than said set $x_{max}$:
                reset $x_{max}$ to the current entropy value;
                increment the threshold, wherein the increment to the threshold is a function of the $x_{min}$ and $x_{max}$;
            determine if the current entropy value is less than both the set threshold and the $x_{min}$, and if the current entropy value is less than both the set threshold and the $x_{min}$:
                set $x_{min}$ to the current entropy value; and
                increment the threshold further, wherein the increment to the threshold is a function of the $x_{min}$ and $x_{max}$; and
            determine if the current entropy value is greater than the set threshold, and if the current entropy value is greater than the set threshold:
                reset $x_{min}$ equal to $x_{max}$;
    marking each frame in the second set of frames, wherein the step of marking comprises marking a frame in the second set of frames as inactive speech frame when the entropy of said frame in the second set of frames is greater than the set threshold, and marking said frame as active speech frame when the entropy of the frame is lesser than the set threshold; and
    transmitting only the active speech frames.

8. The method of claim 7, wherein size of said frames is scalable across different frame sizes.

9. The method of claim 5, wherein quantization levels of said sampled digital signals is scalable across different quantization levels.

10. A system for reducing total bandwidth requirement in voice communication using packet transmission, said system comprising:

an analog to digital converter for sampling analog input audio signals and converting the analog input audio signals into a digital format;

a frame conversion module for converting said sampled digital audio signal into sampled frames;

a central processing unit;

a microprocessor in said central processing unit configured for differentiating active speech frames and inactive speech frames, said microprocessor further configured for:

computing spacings of order statistics of said sampled frames;

measuring the entropy of each of said sampled frame;

setting a threshold for a first set of frames derived from said entropy of said first set of frames, wherein said first set of frames comprises two or more frames, and setting the threshold of a second set of frames that is subsequent to said first set of frames to be equal to the threshold of the first set of frames plus an increment, wherein said second set of frames comprises one or more frames;

recalculating the threshold if there is a change in one of $x_{max}$ and $x_{min}$, wherein $x_{max}$ is set equal to the maximum entropy attained up to a current frame, wherein the $x_{min}$ is set equal to the $x_{max}$ if the current frame is marked as an inactive speech frame, and wherein the $x_{min}$ is set equal to the minimum entropy observed up to the current frame in a contiguous set of exclusively active speech frames in said second set of frames if the current frame is marked as an active speech frame;

marking said second set of frames, wherein the step of marking comprises marking the second set of frames as inactive speech frames when the entropy of the second set of frames is greater than the threshold of the first set of frames, and marking the subsequent frames as active speech frames when the entropy of the subsequent frames is lesser than the threshold of the first set of frames; and transmitting only the active speech frames.

11. The system of claim 10 further comprising a network interface module for accepting said active frames and transmitting the active frames over the network.

12. The system of claim 10 further comprising an echo cancellation module.

13. The system of claim 10 further comprising a speech recognition module.

14. The system of claim 10 further comprising a speech coding module.

15. The system of claim 10, further corresponding to each of said inactive speech frames not transmitted, wherein each of said inactive speech frames not transmitted are substituted by comfort noise at a receiver.

16. The system of claim 10, wherein size of said frames is scalable across different frame sizes.

17. The system of claim 10, wherein quantization levels of said sampled digital signals is scalable across different quantization levels.

* * * * *